(12) United States Patent
Takemura

(10) Patent No.: US 7,359,080 B2
(45) Date of Patent: Apr. 15, 2008

(54) PLAYBACK APPARATUS, ELECTRONIC CAMERA APPARATUS, FUNCTION EXPANSION APPARATUS FOR ELECTRONIC CAMERA APPARATUS, CONTROL METHOD FOR ELECTRONIC CAMERA APPARATUS, CONTROL METHOD FOR IMAGE COMMUNICATION APPARATUS, AND MEDIUM FOR PROVIDING CONTROL PROGRAM

(75) Inventor: Hideki Takemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 11/219,655

(22) Filed: Sep. 7, 2005

(65) Prior Publication Data

US 2006/0009260 A1    Jan. 12, 2006

Related U.S. Application Data

(62) Division of application No. 10/022,507, filed on Dec. 20, 2001, now Pat. No. 6,947,163.

(30) Foreign Application Priority Data

Dec. 26, 2000 (JP) .............................. 2000/395915

(51) Int. Cl.
G06F 3/12       (2006.01)
G06K 15/00      (2006.01)

(52) U.S. Cl. ..................... 358/1.15; 358/1.18; 358/1.6; 348/207.2

(58) Field of Classification Search ............... 358/1.15, 358/1.14, 1.13, 1.1, 1.6, 1.9, 1.18, 407, 468; 348/207.99, 207.1, 207.2; 347/1, 2, 3, 5; 399/1, 8
See application file for complete search history.

(56) References Cited

U.S. PATENT DOCUMENTS

| | | | | |
|---|---|---|---|---|
| 5,864,651 | A * | 1/1999 | Lavie et al. ................ | 358/1.15 |
| 6,822,753 | B1 * | 11/2004 | Momose ..................... | 358/1.13 |
| 2003/0099001 | A1 | 5/2003 | Watanabe et al. ........... | 358/462 |
| 2005/0030318 | A1 | 2/2005 | Ueda .......................... | 345/589 |

* cited by examiner

*Primary Examiner*—Dov Popovici
(74) *Attorney, Agent, or Firm*—Fitzpatrick, Cella, Harper & Scinto

(57) ABSTRACT

In order to provide a convenient digital camera which eliminates the necessity to designate a printer to print in advance and can print image data obtained by photography by reliably transmitting it to a printer existing on a radio network with simple operation, the digital camera performs control such that the classifications of electronic devices constituting the radio network are acquired through a radio communication circuit unit, and if one printer exists on the radio network, the image data is transmitted to the printer, and if a plurality of printers exist on the radio network, the image data is transmitted to a selected one of the printers.

12 Claims, 8 Drawing Sheets

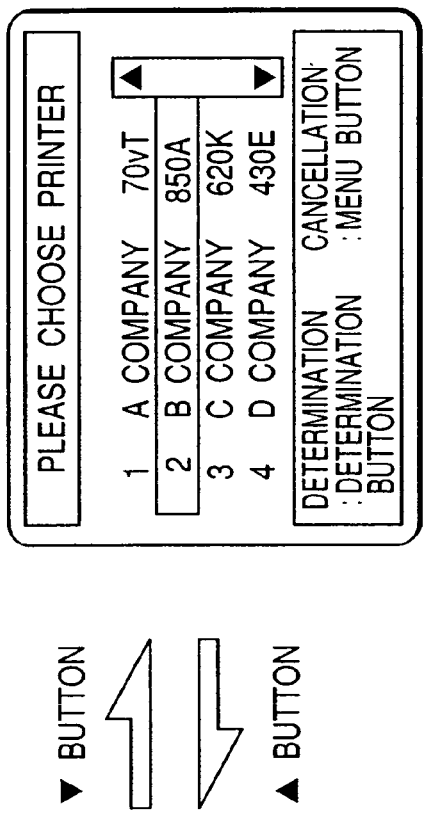
FIG. 5B
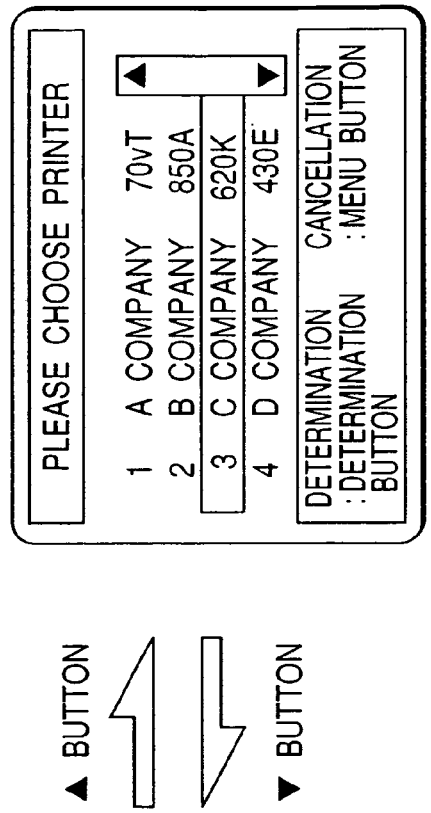
FIG. 5C
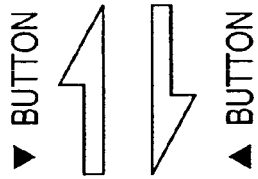
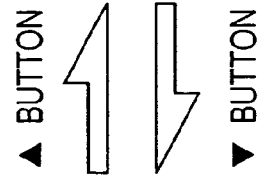
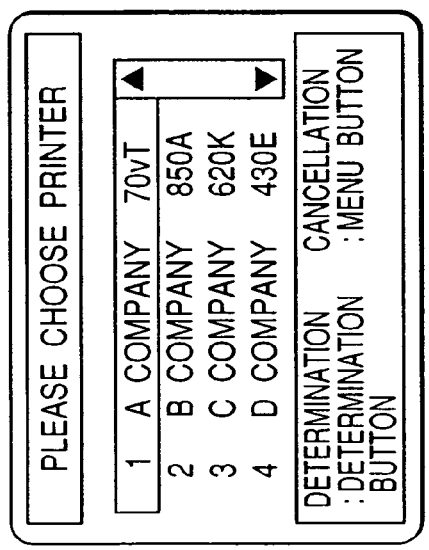
FIG. 5A
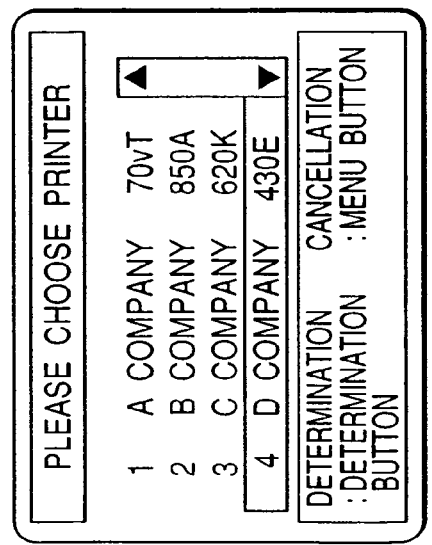
FIG. 5D

PLAYBACK APPARATUS, ELECTRONIC CAMERA APPARATUS, FUNCTION EXPANSION APPARATUS FOR ELECTRONIC CAMERA APPARATUS, CONTROL METHOD FOR ELECTRONIC CAMERA APPARATUS, CONTROL METHOD FOR IMAGE COMMUNICATION APPARATUS, AND MEDIUM FOR PROVIDING CONTROL PROGRAM This application is a divisional of U.S. patent application Ser. No. 10/022,507, filed on Dec. 20, 2001, now U.S. Pat. No. 6,947,163.

BACKGROUND OF THE INVENTION

1. Field of the Invention

The present invention relates to an electronic camera such as a digital camera and, more particularly, to an electronic camera apparatus, playback apparatus (reproduction apparatus), and the like, which constitute a radio network and has a radio communication function of communicating data.

2. Related Background Art

Recently, digital cameras designed to convert image signals obtained by photography into digital signals and recording them on recording media have become popular. In digital cameras, memory cards using nonvolatile semiconductor memory devices as storage media for recording digital image data are generally used.

An image photographed by a digital camera is printed according to the following procedure: (a) removing a memory card from the memory card slot of the digital camera, (b) inserting the removed memory card into the PC card slot of a personal computer or the like through an adapter, and (c) sending a print instruction from the personal computer or the like to the printer connected to the personal computer or the like, thereby printing the photographed image.

In order to eliminate such complexity in operation, a digital camera has been proposed, which has a radio communication function and can directly give a print instruction to a printer by radio communication.

In the above conventional digital camera, however, a printer to print an image, i.e., a printer to which image data is to be transmitted by radio communication, must be designated in advance.

Even if a printer to which image data is to be transmitted is designated in advance, printing cannot be performed if the printer is powered off or the signal strength is small due to the specific positional relationship between the printer and other electronic devices. If the printer does not exist on the radio network, printing cannot be performed even if other printers exist on the radio network.

Furthermore, it is impossible to set a printer in advance while the user is on a trip or on the road. It is inconvenient to designate a printer every time printing is done.

SUMMARY OF THE INVENTION

It is an object of the present invention to solve all or at least one of the above problems.

The present invention has been made in consideration of the above situation, and has as its object to provide a convenient playback apparatus, electronic camera apparatus, and the like which can reliably transmit image data obtained by photography to a printer existing on a radio network with simple operation and print it.

In order to achieve the above objects, there is provided a playback apparatus which plays back image data stored in a storage medium, comprising:

a radio communication unit which constitutes a radio network, together with a plurality of electronic devices, and communicates data including the image data;

a classification acquisition unit which acquires classifications of electronic devices constituting the radio network through the radio communication unit; and a determination unit which determines an electronic device, with which data communication is to be performed through the radio communication unit, on the basis of classification information of each electronic device acquired by the classification acquisition unit.

It is still another object of the present invention to easily re-transmit image data even if communication is disconnected while the image data is transmitted.

In order to achieve the above object, there is provided a playback apparatus which plays back image data stored in a storage medium, comprising:

a radio communication unit which constitutes a radio network, together with a plurality of electronic devices, and communicates data including the image data;

a classification acquisition unit which acquires classifications of electronic devices constituting the radio network through the radio communication unit;

a determination unit which determines an electronic device, with which data communication is to be performed through the radio communication unit, on the basis of classification information of each electronic device acquired by the classification acquisition unit; and wherein if communication with an electronic device determined by the determination unit with which data communication is to be performed fails while image data is being transmitted by the radio communication unit, the determination unit determines a new electronic device with which data communication is to be performed.

It is still another object of the present invention to improve the linkage between photography operation and transmitting operation or printing operation.

In order to achieve the above object, there is provided a playback apparatus which plays back image data stored in a storage medium, comprising:

a radio communication unit which constitutes a radio network, together with a plurality of electronic devices, and communicates data including the image data;

a classification acquisition unit which acquires classifications of electronic devices constituting the radio network through the radio communication unit;

a determination unit which determines an electronic device, with which data communication is to be performed through the radio communication unit, on the basis of classification information of each electronic device acquired by the classification acquisition unit;

a transmission instruction input unit which inputs an instruction to transmit image data through the radio communication unit, and a transmission control unit which performs control to transmit image data to the electronic device determined by the determination unit when an instruction to transmit the image data is generated by the transmission instruction input unit; and input unit which inputs image data, and when the transmission instruction input unit is operated while the input image data is displayed for a predetermined period of time after the image data is input, the image data is transmitted to the electronic device determined by the determination unit through the radio communication unit.

The above and other objects, features, and advantages of the present invention will be apparent from the following detailed description in conjunction with the accompanying drawings and the appended claims.

BRIEF DESCRIPTION OF THE DRAWINGS

FIGS. 5A, 5B, 5C and 5D are views each showing how a list of the manufacturers and models of printers is displayed;

DETAILED DESCRIPTION OF THE PREFERRED EMBODIMENTS

Preferred embodiment of the present invention will be described with reference to the accompanying drawings.

First Embodiment

Figure 1:
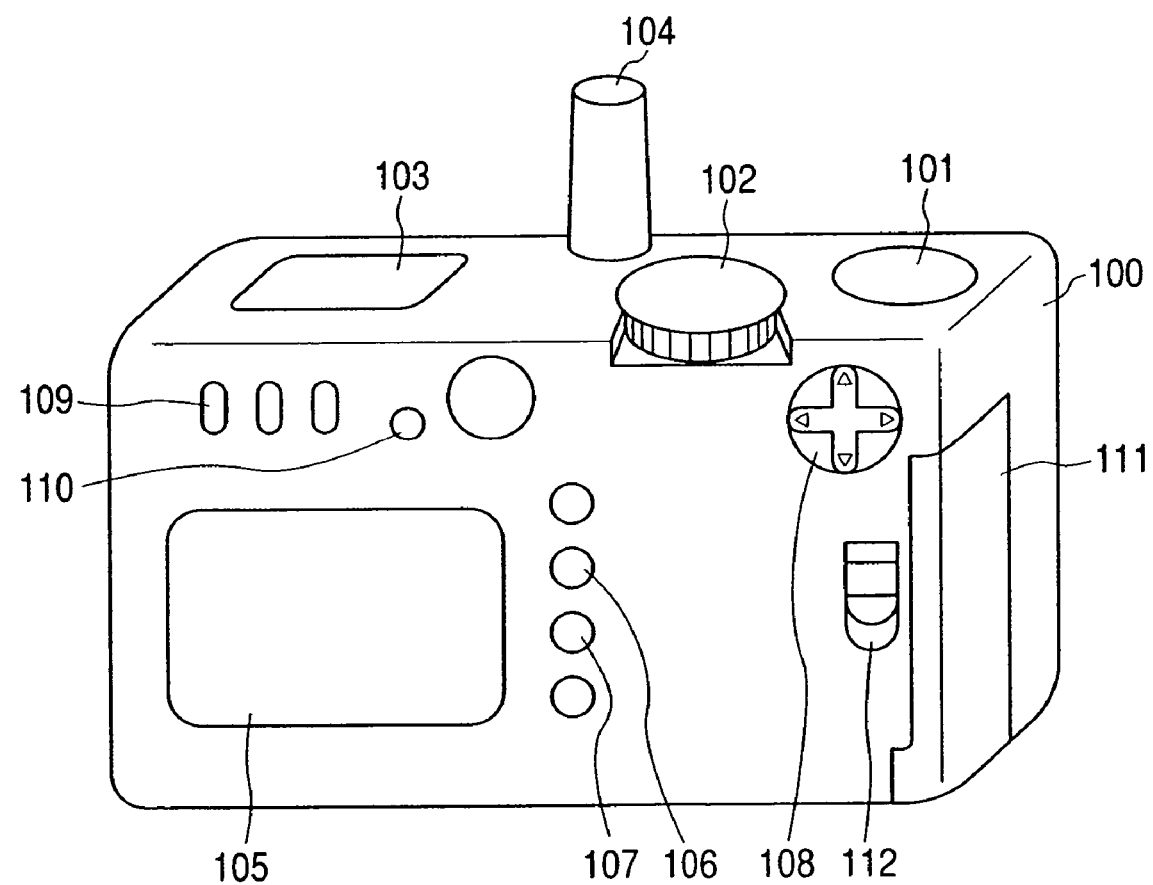
FIG. 1 is a perspective view showing the outer appearance of the rear surface side of an electronic camera apparatus according to the first embodiment of the present invention.

FIG. 1 is a perspective view showing the outer appearance of the rear surface side of an electronic camera apparatus according to the first embodiment of the present invention.

Referring to FIG. 1, a digital camera 100 has a lens (not shown) on its front surface. The digital camera 100 has, on its upper surface, a shutter button 101 for giving an instruction to take a picture, a mode selection dial 102 for setting an operation mode of the digital camera 100, and a compact liquid crystal display device 103 for displaying the operation state or the like of the digital camera 100 in characters and pictographs. An antenna 104 for radio communication is also mounted on the upper surface.

The digital camera 100 has, on its rear surface, a color liquid crystal display device 105 for displaying an object image to be photographed or an image recorded on a memory card in the playback mode, a menu button 106 for invoking menu items for setting various operation conditions for the digital camera 100, a determination button 107 for designating an item selected from the menu items, a cross cursor button 108 for giving an instruction to select a menu item or change an operation state, and other operation buttons for designating the operation state of the digital camera 100. In addition, the digital camera 100 has a printing button 109 for giving an instruction to transmit image data to a printer by radio communication.

Furthermore, the digital camera 100 has, on its rear surface, an LED lamp 110 for displaying the operation state of the digital camera 100 or providing alarm display and a finder for checking an object image.

A memory card cover 111 is provided on one side surface of the digital camera 100. The memory card cover 111 is opened by pressing a memory card cover open lever 112 on the rear surface of the camera body downward, and a memory card as a storage medium is attached/detached.

An interface connector (not shown) for connecting a cable or the like for communication with other electronic devices is provided on the other side surface of the digital camera 100. A battery port (not shown) is formed in the lower surface of the digital camera 100 to allow a battery to be loaded.

Figure 2:
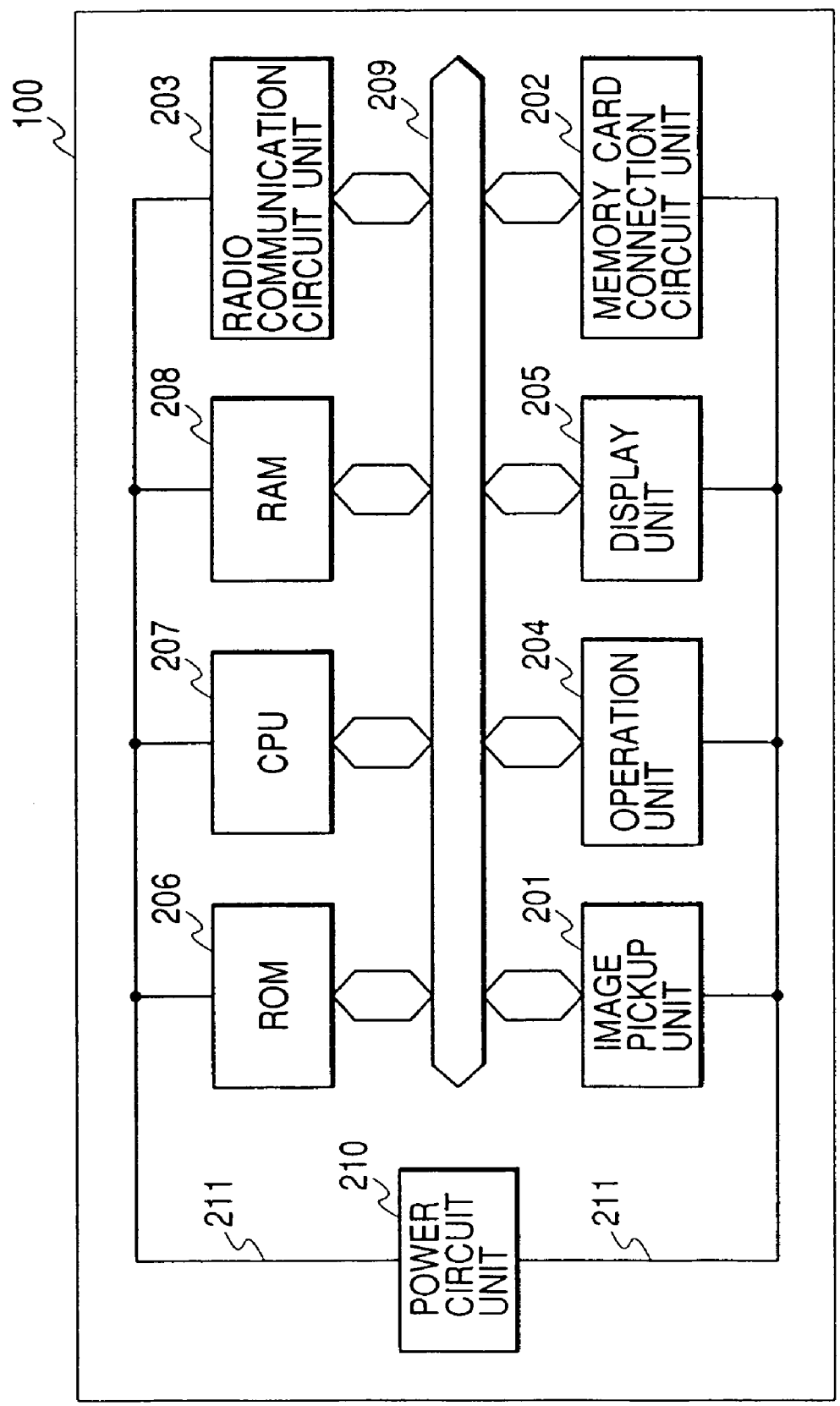
FIG. 2 is a block diagram showing the arrangement of a digital camera 100 in FIG. 1.

FIG. 2 is a block diagram showing the arrangement of the digital camera 100 in FIG. 1.

The digital camera 100 includes, as its constituent elements, an image pickup unit 201, memory card connection circuit unit 202, radio communication circuit unit 203, operation unit 204, display unit 205, ROM 206, CPU 207, and RAM 208. These elements are connected to each other through a bus line 209. The digital camera 100 also has a power circuit unit 210.

The image pickup unit 201 is roughly constituted by a lens on which light reflected by an object is incident, a charge-coupled device (CCD) for converting the light image formed by the lens into an electrical signal, an analog/digital converter for converting the analog electrical signal output from the CCD into a digital electrical signal, and the like. The image pickup unit 201 has the function of outputting the digital image data of the object to the bus line 209.

The memory card connection circuit unit 202 is comprised of a memory card connection connector to which a memory card is attached and a memory card control circuit. The digital camera 100 records image data obtained by photography on the memory card attached to the memory card connection connector.

The radio communication circuit unit 203 is roughly constituted by an antenna, RF circuit, encoding/decoding circuit, and the like, and has the function of forming a radio network, together with an electronic device and information processing apparatus having equivalent radio communication functions and transmitting and receiving data with each other. The form of a radio network will be described later with reference to FIG. 3.

The operation unit 204 is comprised of switches and the like interlocked with buttons, dials, and the like which are used to operate the digital camera 100, e.g., the photography button 101 for giving an instruction to take a picture, the mode selection dial 102 for selecting an operation mode of the digital camera 100, and the menu button 106 for giving an instruction to display a menu window, and has the function of outputting the states of these switched as electrical signals. The operation unit 204 also has the function of outputting a change in the state of a switch upon operation of a button or dial as a change in electrical signal.

The display unit 205 is comprised of the compact liquid crystal display device 103, color liquid crystal display device 105, LED lamp 110, and the like. The color liquid crystal display device 105 has the function of displaying an image as a photography target which is formed on the CCD, and also has the function of playing back and displaying the image data stored in a memory card. In addition, the color liquid crystal display device 105 has the function of displaying the menu window upon operation of the menu button 106 or the like. Furthermore, the color liquid crystal display device 105 has the function of displaying character information or the like to indicate that image data is being transmitted by the radio communication circuit unit 203.

The LED lamp 110 displays the operation state of the digital camera and performs alarm display for the user. In this embodiment, while the radio communication circuit unit 203 is transmitting image data, the LED lamp 110 blinks to warn the user about the transmission.

The ROM 206 is a nonvolatile memory in which control procedures for the CPU 207 are stored in advance. The ROM 206 has the function of outputting stored contents to the bus line 209 in accordance with a read instruction from the CPU 207.

The CPU 207 has the function of controlling the image pickup unit 201, controlling the memory card connection circuit unit 202, managing a memory card attached to a memory card connection connector, controlling the radio communication circuit unit 203, detecting the switch state output from the operation unit 204, and controlling the display unit 205 by executing the control procedures stored in the ROM 206.

The CPU 207 also has the function of performing control to check upon operation of the printing button 109 whether a printer exists on a radio network and transmit image data to the printer, if only one printer exists on the network, or to a selected one of printers if a plurality of printers exist on the network.

Although described in detail later, upon detecting a communication failure during transmission of image data due to power-down of an electronic device or disconnection of the communication, the CPU 207 also performs processing to newly set a transmission destination for the image data so as to retransmit the data.

The RAM 208 serves as a temporary buffer for the digital image data output from the image pickup unit 201, a temporary storage for the data to be written on a memory card or the data read out from the memory card, a work memory for the CPU 207, and the like. The RAM 208 has a secured area for storing the identification code of a printer as a destination to which data is to be transmitted when the printing button 109 is pushed to transmit image data.

The power circuit unit 210 is roughly constituted by a battery, DC/DC converter, and the like, and has the function of supplying power to each constituent element of the digital camera through a power line 211.

The radio network constituted by the digital camera according to this embodiment and other electronic devices and information processing apparatuses will be described next.

Figure 3:
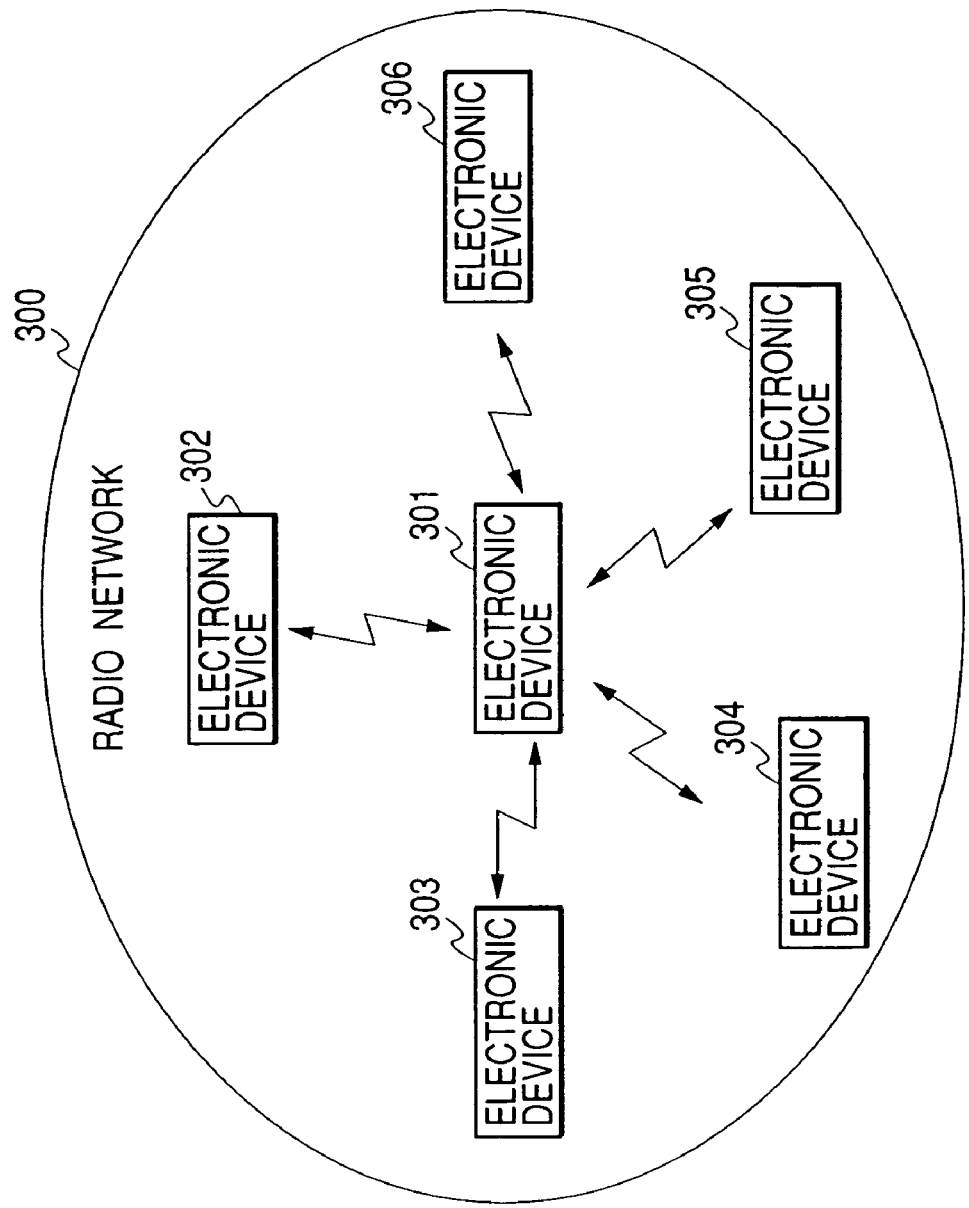
FIG. 3 is a view showing the form of a radio network according to the first embodiment.

FIG. 3 is a view showing the form of the radio network according to this embodiment.

Referring to FIG. 3, a radio network 300 is constituted by six electronic devices 301 to 306 each having a radio communication function.

Each of the electronic devices 301 to 306 transmits/receives a carrier wave modulated with an information signal and transmits information. Radio communication is performed by using, as a carrier wave, a radio wave that undergoes frequency-hopping of 79 frequencies set at 1-MHz intervals in the frequency range of 2.402 to 2.480 GHz at a maximum rate of 1,600 times per sec.

The radio network 300 includes the electronic device 301 serving as one main station for performing communication control. All the electronic devices 302 to 306 other than the main station in the radio network serve as subsidiary stations and transmit data under the control of the main station.

The respective electronic devices 301 to 306 have their own unique identification codes. In transmitting data, each subsidiary station specifies a distant device by transmitting the identification code of a transmission destination prior to the data under the control of the main station.

Note that the present invention is not limited to the form of the radio network described above, and can be applied to a radio network in any form as long as the present invention can be implemented. Each electronic device may incorporate a circuit for implementing radio communication or have a radio communication unit connected externally. In addition, the type of radio waves and the form of transmission data are not limited to those described above, and radio waves having any frequencies can be used. In addition, an encoding method is not specifically limited, and it does not matter whether frequency hopping is performed or not.

The operation of the digital camera according to this embodiment will be described in detail below.

Figure 4:
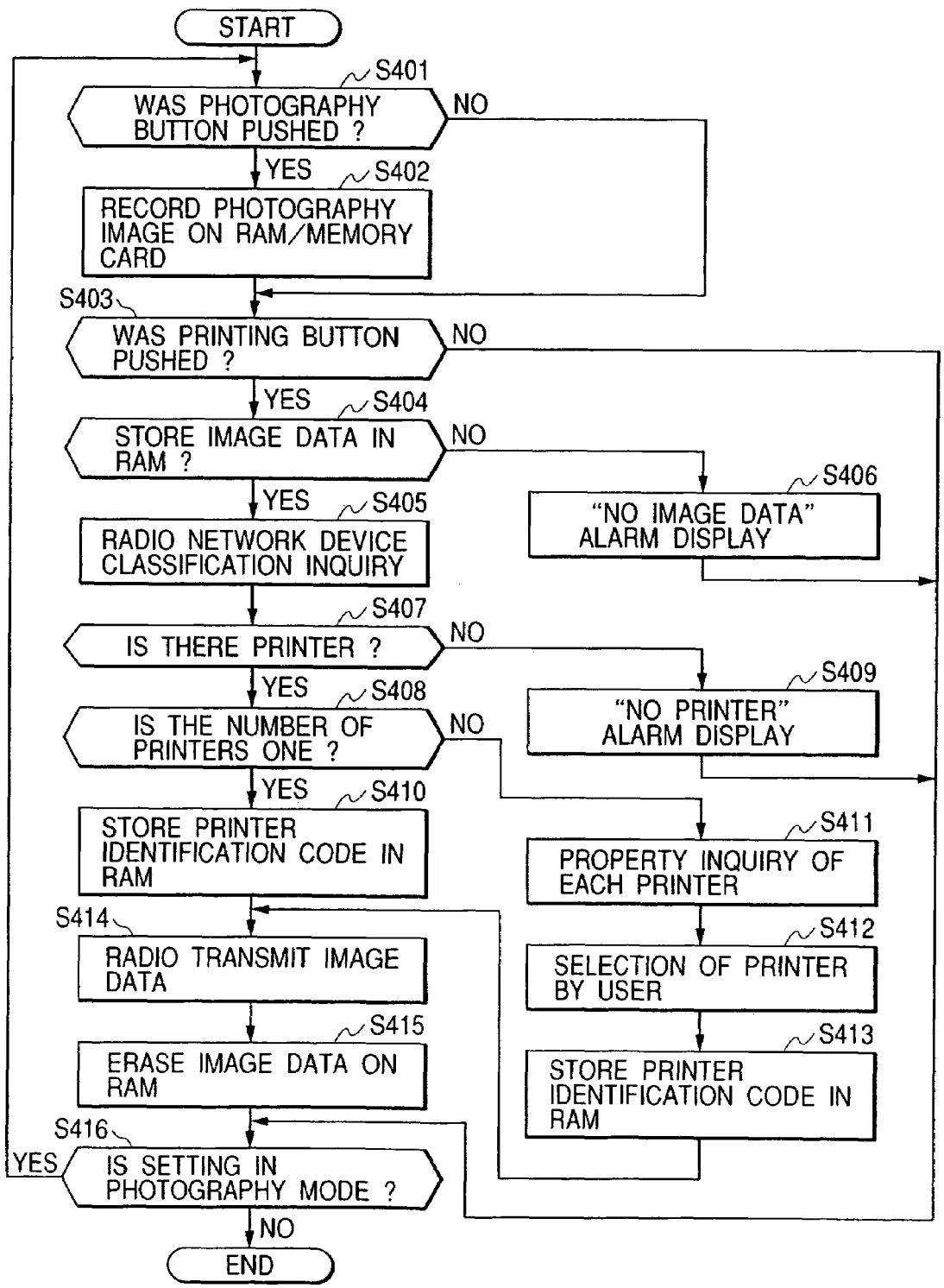
FIG. 4 is a flow chart showing an operation procedure in the photography mode of a digital camera according to the first embodiment.

FIG. 4 is a flow chart showing an operation procedure in the photography mode of the digital camera according to the first embodiment. Note that the following control method can be implemented by storing a program based on the flow chart in FIG. 4 in the ROM 206 and executing it.

When the digital camera 100 is set in the photography mode upon operation of the mode selection dial, the CPU 207 executes the control procedure stored in the ROM 206 in advance, and executes the procedure shown in FIG. 4 on the way.

In step S401, the CPU 207 monitors the signal output from the operation unit 204 to check whether the photography button 101 is pushed. If YES in step S401, the flow advances to step S402. If NO in step S401, the flow advances to step S403.

In step S402, the CPU 207 transfers the digital image data obtained by photography by the image pickup unit 201 to the RAM 208 through the bus line 209 and stores it in the RAM 208, and records the image data on the memory card attached to the memory card connection connector. The flow then advances to step S403.

In step S403, the CPU 207 monitors the signal output from the operation unit 204 to check whether the printing button 109 is pushed. If YES in step S403, the flow advances to step S404. If NO in step S403, the flow advances to step S416.

Note that if the image is displayed on the liquid crystal display of the camera in step S403, it helps the user determine the necessity of transmission or printing. For this reason, after photography operation, a preview mode is preferably executed to display the photography image for a predetermined period of time or until the start of next photography. If this camera is designed to allow the user to push the printing button 109 during execution of the preview mode, the use can check images. In addition, this makes it possible to link photography operation with print instructing operation (or transmission instructing operation), thereby eliminating the necessity to instruct print operation (or instruct transmission operation) while interrupting photography operation.

In step S404, the CPU 207 checks whether any image data is stored in the RAM 208. If YES in step S404, the flow advances to step S405. If NO in step S404, the flow advances to step S406.

In step S405, the CPU 207 communicates with the respective electronic devices constituting the radio network through the radio communication circuit unit 203, and makes inquiries about the classifications of electronic devices and the like. The flow then advances to step S407.

If it is determined in step S404 that no image data is stored in the RAM 208, the CPU 207 displays, on the color liquid crystal display device 105, information indicting that there is no image data to be transferred, and blinks the LED lamp 110 to perform alarm display in step S406. The flow then advances to step S416.

In step S407, the CPU 207 checks whether any printer (printing apparatus) exists among the electronic devices constituting the radio network, to which the CPU 207 has made inquires in step S405. If a printer exists in the radio network 300, the flow advances to step S408. If no printer exists, the flow advances to step S409.

In step S408, the CPU 207 checks whether one or a plurality of printers exist in the radio network 300. If one printer exists, the flow advances to step S410.

If a plurality of printers exist, the flow advances to step S411.

If it is determined in step S407 that no printer exists in the radio network 300, the CPU 207 displays, on the color liquid crystal display device 105, information indicating that no printer exists in the radio network 300, and blinks the LED lamp 110 to perform alarm display in step S409. The flow then advances to step S416.

In step S410, the CPU 207 writes the identification code of the single printer existing in the radio network 300 in the identification code storage area in the RAM 208. The flow then advances to step S414.

If it is determined in step S408 that a plurality of printers exist in the radio network 300, the CPU 207 communicates with the plurality of printers existing in the radio network 300 through the radio communication circuit unit 203, and makes inquiries about the properties of the respective printers. The flow then advances to step S412. Note that in this embodiment, pieces of property information about which the printers are inquired are manufacturers and models.

In step S412, the CPU 207 displays, on the color liquid crystal display device 105, a list of manufacturers and models of the respective printers which are acquired in step S411, and causes the user of the digital camera 100 to select a printer to be used for printing by using the cross cursor button 108 and determination button 107. The flow then advances to step S413. A method of selecting and determining one printer from a list of printers displayed on the color liquid crystal display device 105 will be described later with reference to the accompanying drawings.

In step S413, the CPU 207 writes the identification code of the printer selected in step S412 in the identification code storage area in the RAM 208. The flow then advances to step S414. In step S414, the CPU 207 sets the identification code of the printer identification code stored in the RAM 208 in step S413 to a transfer destination address, and radio-transmits the image data stored in the RAM 208 through the radio communication circuit unit 203. The flow then advances to step S415. At this time, the CPU 207 blinks the LED lamp 110 and displays character information or the like on the color liquid crystal display device 105, thereby informing the user that image data is being transmitted.

In step S415, the CPU 207 deletes the image data and the printer identification code stored in the RAM 208. The flow then advances to step S416. In step S416, the CPU 207 monitors the signal output from the operation unit 204 to check whether the mode selection dial 102 is set to the photography mode or a mode other than the photography mode. If the mode selection dial 102 is set to the photography mode, the flow returns to step S401. If the mode selection dial 102 is set to a mode other than the photography mode, the operation in the photography mode is terminated.

Although not described in FIG. 4, the CPU 207 monitors, until transmission in step S414 is completed after steps S410 and S413, whether communication with the device to receive image data has failed.

If communication cannot be performed, the flow temporarily returns to step S405 to automatically check whether there is any new electronic device that can receive image data. If only one electronic device is detected afterward, this electronic device automatically receives the image data.

In this case, since the camera automatically switches image data transmission destinations, the CPU 207 displays, on the LCD 105, information indicating that the transmission destination is switched to a new one, and the specific electronic device serving as an image transmission destination.

With this arrangement, if a communication failure occurs when, for example, the power supply of an image data receiving device is disconnected, data can be smoothly transmitted to another electronic device.

A method of selecting one printer from a plurality of printers in step S412 will be described below.

FIGS. 5A to 5D show how a list of manufacturers and models of printers acquired in step S411 is displayed on the color liquid crystal display device 105.

FIGS. 5A to 5D show a case where four printers exist in the radio network 300. The user designates one printer by operating the "up" button and "down" button of the cross cursor button 108 and the determination button 107 while watching this display window.

If, for example, the user pushes the "down" button of the cross cursor button 108 three times in the display state in FIG. 5A, the display state of the color liquid crystal display device 105 shifts to the display state shown in FIG. 5D through the display states in FIGS. 5B and 5C. If the user pushes the determination button 107 in this state, "430E" of "D company" is selected as a printer to which data is to be transmitted, and printing is performed by using this printer.

As described above, with the processed based on the flow chart of FIG. 4, if one printer exists in the radio network 300, image data is transmitted to the printer to print the data. If a plurality of printers exist in the radio network 300, image data is transmitted to a selected printer, thus printing the data.

The first embodiment has exemplified the case where pieces of property information of which printers existing in the radio network 300 are inquired are manufacturer information and model information. However, the present invention is not limited to this. For example, the maximum resolution with which each printer can print and the number of colors that can be expressed by that printer can be used as pieces of property information.

In the first embodiment described above, as a method of specifying one printer of a plurality of printers, the method of making the user of the digital camera select has been described above. Obviously, however, the present invention incorporates a method of automatically specifying a printer on the basis of the evaluation values obtained by substituting the property information (e.g., maximum resolution) of each printer into a predetermined evaluation function. If, for example, a print with high image quality is to be obtained, a printer with the highest image quality is always automatically selected by this method. This eliminates the necessity to perform cumbersome selecting operation. In addition, the trouble of disconnection of communication during transmission can be avoided by selecting an electronic device with strong radio waves.

It is convenient if a specific electronic device serving as a reception device is automatically selected depending on the purpose of image data to be used (e.g., for high-quality printing or browsing on the Internet).

The first embodiment described above has exemplified the method of displaying information indicating that image data is being transmitted, and performing alarm display when no image data is stored in the RAM 208 and alarm display when no printer exists on the radio network 300 by blinking the LED lamp 110 or displaying character information and graphic pattern information on the color liquid crystal display device 105. Obviously, however, the present invention incorporates a method of displaying information indicating that data is being transmitted and performing alarm display by displaying characters on the compact liquid crystal display device 103. In addition, such operation may be performed by a combination of display operation on the compact liquid crystal display device 103 and display operation on the LED lamp 110 and color liquid crystal display device 105.

Second Embodiment

The first embodiment described above has exemplified the digital camera having the radio communication function. However, the present invention is not limited to the first embodiment, and can be applied to a digital camera to which a function expansion apparatus for expanding the function of the digital camera is connected. The second embodiment in which the present invention is applied to a function expansion apparatus for a digital camera will be described below.

Figure 6:
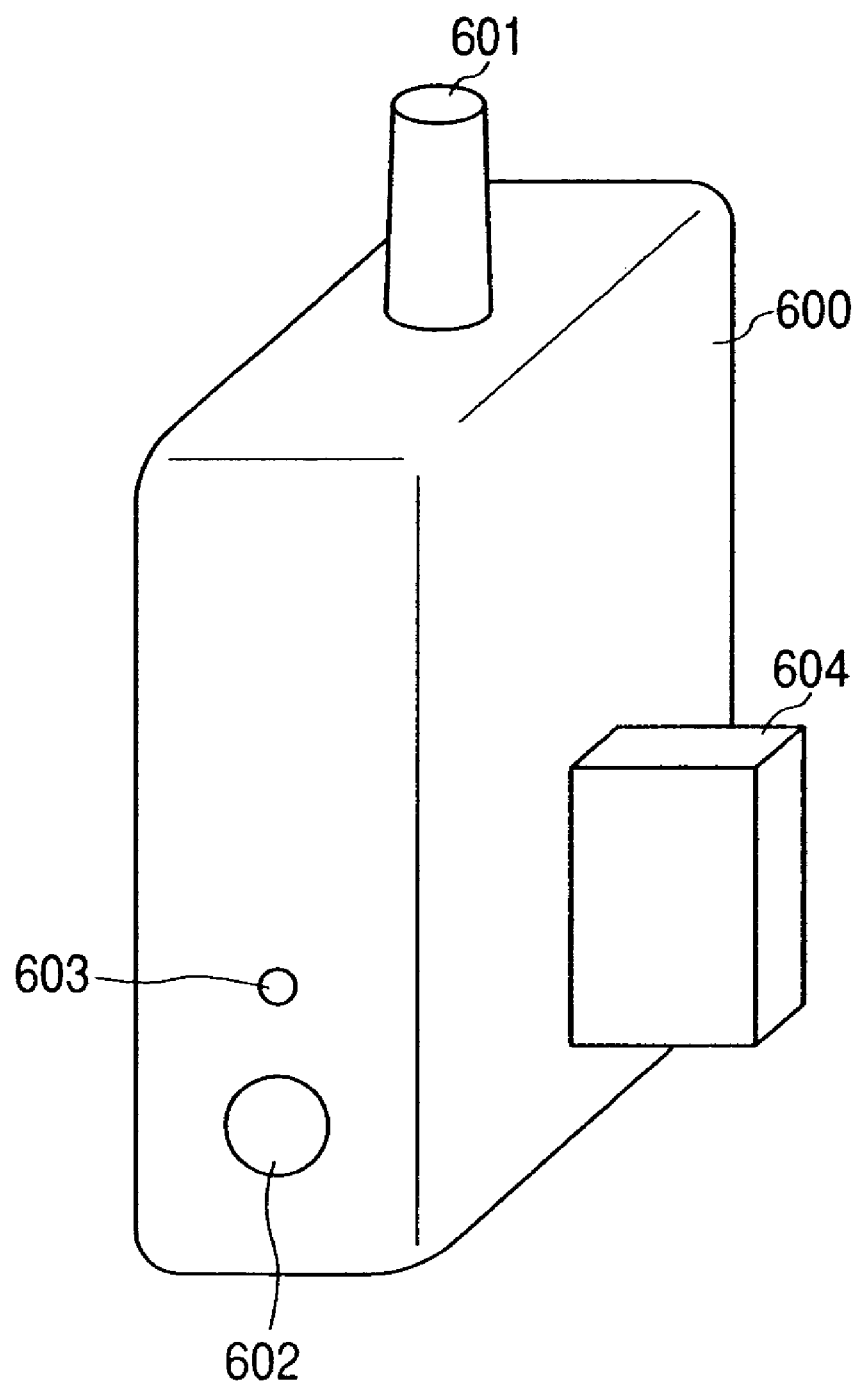
FIG. 6 is a perspective view showing the outer appearance of a function expansion apparatus for an electronic camera apparatus according to the second embodiment of the present invention.

FIG. 6 is a perspective view showing the outer appearance of the function expansion unit for the electronic camera apparatus according to the second embodiment of the present invention.

Referring to FIG. 6, a function expansion apparatus 600 for a digital camera has, on its upper surface, an antenna 601 for performing radio communication. The function expansion apparatus 600 has, on its side surface, a printing button 602 for giving an instruction to transmit data to a printer, and an LED lamp 603 for displaying the operation state of the function expansion apparatus 600 or performing alarm display. The function expansion apparatus 600 has, on its other surface, a digital camera connection connector 604 for connection to a digital camera (not shown). The function expansion apparatus 600 is mechanically coupled and electrically connected to the digital camera (not shown) through the digital camera connection connector 604.

Figure 7:
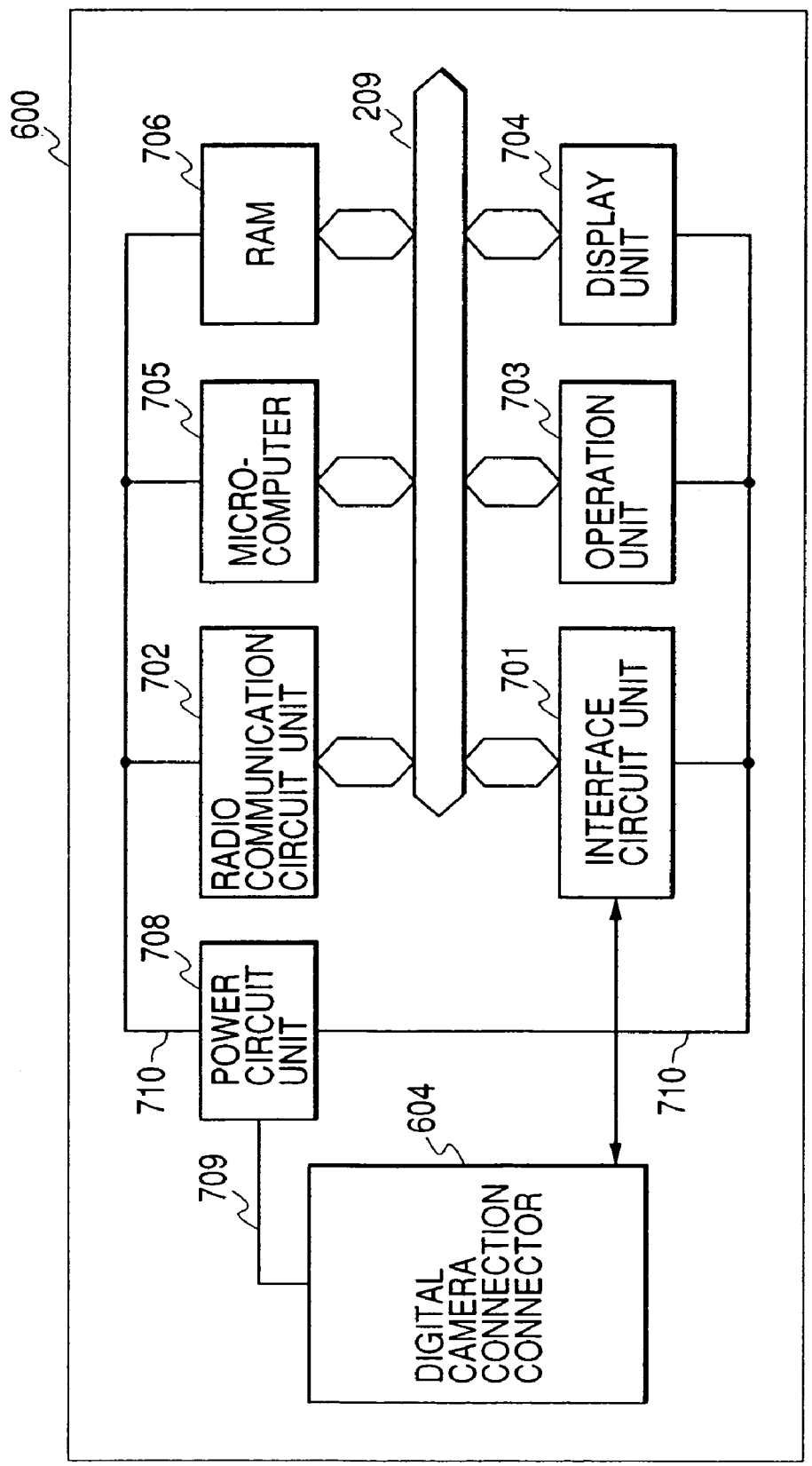
FIG. 7 is a block diagram showing the arrangement of the function expansion apparatus for a digital camera according to the second embodiment.

FIG. 7 is a block diagram showing the arrangement of the function expansion apparatus for the digital camera according to the second embodiment.

The function expansion apparatus 600 has as its constituting elements an interface circuit 701, radio communication circuit unit 702, operation unit 703, display unit 704, microcomputer 705, and RAM 706, in addition to the digital camera connection connector 604. These constituting elements are connected to each other through a bus line 707. The function expansion apparatus 600 also has a power circuit unit 708 which is powered by the digital camera via the digital camera connection connector 604 and supplies power to the respective constituting elements of the above-mentioned elements.

The digital camera connection connector 604 connects the function expansion apparatus 600 with the digital camera (not shown). Connecting this digital camera connection connector 604 to the external connection connector of the digital camera (not shown) couples them mechanically as well as electrically.

The interface circuit unit 701 has the function of communicating serial data with the digital camera connected through the digital camera connection connector 604, and transmits/receives data to/from the digital camera under the control of the microcomputer 705.

The radio communication circuit unit 702 is roughly constituted by an antenna, RF circuit, encoding/decoding circuit, and the like, and has the function of forming a radio network 300, together with an electronic device and information processing apparatus having equivalent radio communication functions and transmitting and receiving data with each other.

The operation unit 703 is constituted by switches and the like interlocked with the printing button 602 for giving an instruction to transmit data to the printer, and has the function of outputting the operation of the printing button 602 as a change in electrical signal.

The display unit 704 is constituted by the LED lamp 603 and the like and has the function of displaying the operation state of the function expansion apparatus 600 and performing alarm display for the user. In this embodiment, the display unit 704 has the function of blinking the LED lamp 603 to inform the user that data is being transmitted when the data is being transmitted by the radio communication circuit unit 702. In addition, the display unit 704 has the function of blinking the LED lamp 603 to perform alarm display for the user if no image data can be acquired from the digital camera or no printer exists on the radio network 300 when the user pushes the printing button 602 to give an instruction to transmit image data.

The microcomputer 705 incorporates a memory (not shown), and has the function of controlling the interface circuit unit 701, managing communication with the digital camera connected through the digital camera connection connector 604, controlling the radio communication circuit unit 702, detecting the switch state output from the operation unit 703, and controlling the operation unit 703 in accordance with the control procedures stored in the memory.

The microcomputer 705 has the function of performing following control operation. When the printing button 602 is operated, the microcomputer 705 acquires image data from the connected digital camera, and checks whether any printer exists on the radio network 300. If only one printer exists, the microcomputer 705 transmits the image data to the printer. If a plurality of printers exist on the network, the microcomputer 705 transmits the image data to one of the printers.

The RAM 706 serves as a temporary storage for the image data read out from the digital camera through the interface circuit unit 701 and digital camera connection connector 604, a work memory for the microcomputer 705, and the like. The RAM 706 has a secured area for storing the identification code of a printer as a destination to which data is to be transmitted when the printing button 602 is pushed to transmit image data.

The power circuit unit 708 has the function of receiving power from the connected digital camera through the digital camera connection connector 709 and supplying the power to each element of the function expansion apparatus 600 through a power line 710. The power circuit unit 708 has a reset circuit, and has the following function. When the function expansion apparatus 600 is connected to the digital camera through the digital camera connection connector 604 and receives power from the digital camera, the power circuit unit 708 initializes the function expansion apparatus 600 by using the reset circuit.

Figure 8:
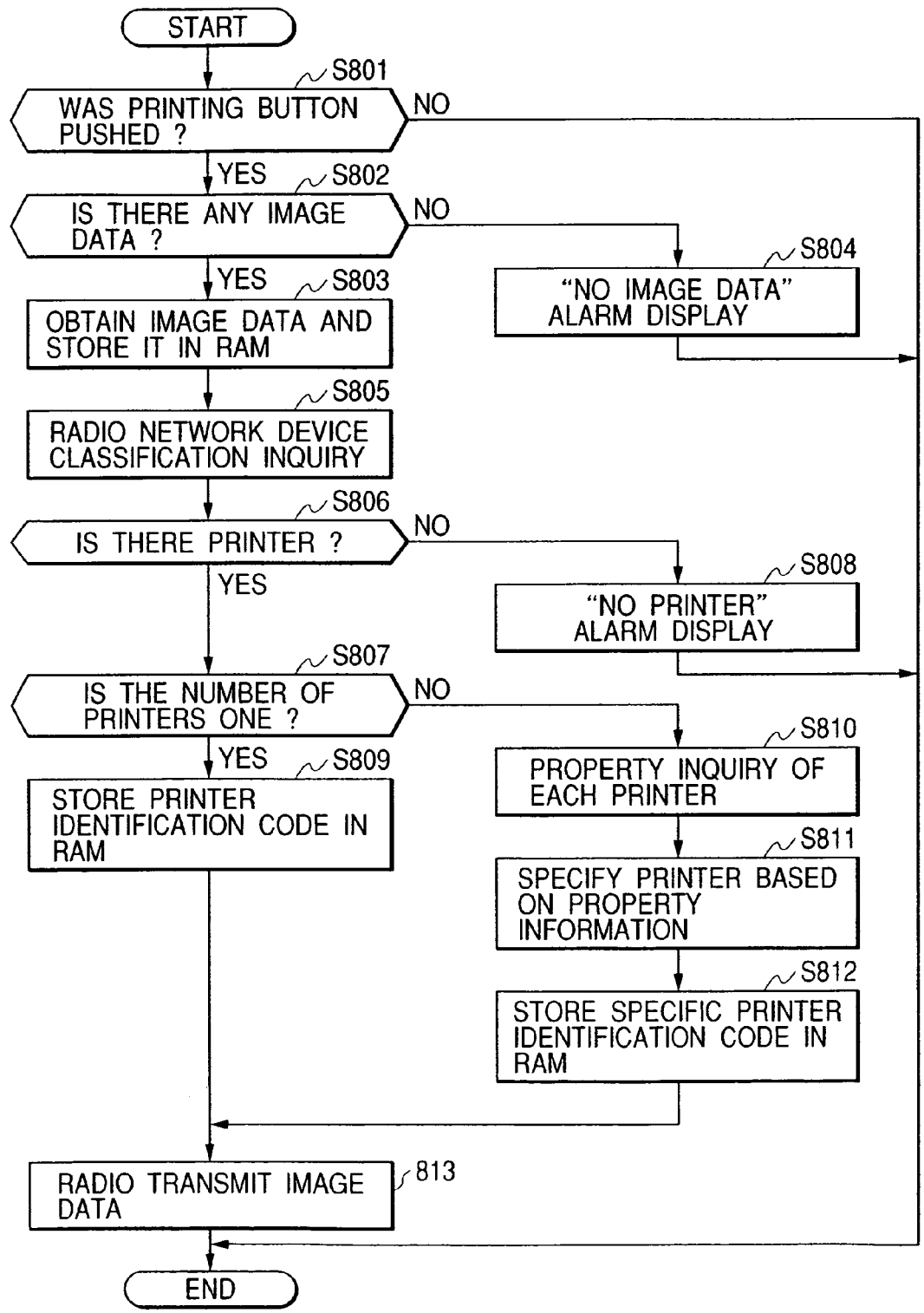
FIG. 8 is a flow chart showing an operation procedure in the function expansion apparatus for the digital camera according to the second embodiment.

The operation of the function expansion apparatus for the electronic camera apparatus according to this embodiment will be described below with reference to FIG. 8. FIG. 8 is a flow chart showing an operation procedure for the function expansion apparatus for the digital camera according to the second embodiment. Note that the following control method can be implemented by storing a program based on the flow chart of FIG. 8 in a storage unit in the microcomputer 705 and executing it.

The function expansion apparatus 600 is mounted on the digital camera through the digital camera connection connector 604. While the function expansion apparatus 600 is receiving power from the digital camera and operating, the microcomputer 705 executes the control procedure stored in the internal memory (not shown) and repeatedly executes the procedure shown in FIG. 8 at a predetermined timing.

In step S801, the microcomputer 705 monitors the signal output from the operation unit 703 to check whether the printing button 602 is pushed. If YES in step S801, the flow advances to step S802. If NO in step S801, this processing is terminated.

In step S802, the microcomputer 705 makes an inquiry about the presence/absence of image data in the digital camera connected through the digital camera connection connector 604. If image data is present in the digital camera, the flow advances to step S803. If no image data is present, the flow advances to step S804. In step S803, the microcomputer 705 acquires image data from the mounted digital camera and stores the data in the RAM 706. The flow then advances to step S805.

If it is determined in step S802 that no image data is present in the digital camera, the microcomputer 705 blinks the LED lamp 603 to perform alarm display to the user in step S804, and terminates the processing. At this time, the microcomputer 705 may inform the mounted digital camera of the above situation and perform alarm display by displaying the corresponding information on the liquid crystal display unit of the digital camera or the like.

In step S805, the microcomputer 705 communicates with the respective electronic devices constituting the radio network 300 through the radio communication circuit unit 702 and makes inquiries about the classifications of electronic devices or the like. The flow then advances to step S806. In step S806, the microcomputer 705 checks, on the basis of the classification information of each electronic device about which the inquiries were made in step S805, whether any printer exists on the radio network 300. If YES in step S806, the flow advances to step S807. If NO in step S806, the flow advances to step S808.

In step S807, the microcomputer 705 checks whether one or a plurality of printers exist on the radio network 300. If one printer exists, the flow advances to step S809. If a plurality of printers exist, the flow advances to step S810.

If it is determined in step S806 that no printer exists on the radio network 300, the microcomputer 705 blinks the LED lamp 603 to perform alarm display in step S808, and terminates the processing. At this time, the microcomputer 705 may inform the mounted digital camera of the above situation and perform alarm display by displaying the corresponding information on the liquid crystal display unit of the digital camera or the like.

In step S809, the microcomputer 705 writes the identification code of the single printer existing on the radio network 300 in the identification code storage area in the RAM 706. The flow then advances to step S813.

If it is determined in step S807 that a plurality of printers exist on the radio network 300, the microcomputer 705 communicates with the respective printers existing on the radio network 300 trough the radio communication circuit unit 702 and makes inquires about the properties of the printers in step S810. The flow then advances to step S811. Note that in this embodiment, pieces of information about which each printer are inquired are a printable color count and maximum resolution.

In step S811, the microcomputer 705 specifies one printer to be used for printing on the basis of the printable color count information and maximum resolution information as the pieces of property information about which the inquires were made in step S810. The flow then advances to step S812. In this embodiment, of printers with the maximum printable color count, a printer with the maximum resolution is specified as a printer to be used for printing. If there are a plurality of such printers, an arbitrary printer is specified as a printer to be used for printing.

In step S812, the microcomputer 705 writes the identification code of the printer specified in step S811 in the identification code storage area in the RAM 706. The flow then advances to step S813. In step S813, the microcomputer 705 sets the printer identification code stored in the identification code storage area in the RAM 706 to a transfer destination address, and radio-transmits the image data stored in the RAM 706 through the radio communication circuit unit 702, thus terminating this processing. At this time, the microcomputer 705 blinks the LED lamp 603 to inform the user that image data is being transmitted.

Although not written in FIG. 8, the microcomputer 705 monitors, until transmission in step S813 is completed after steps S809 and S812, whether communication with the device to receive image data has failed.

If communication cannot be performed, the flow temporarily returns to step S805 to automatically check whether there is any new electronic device that can receive image data. If only one electronic device is detected afterward, this electronic device automatically receives the image data.

As described above, by performing processing in accordance with the flow chart of FIG. 8, printing can be performed as follows. If only one printer exists on the radio network 300, image data is transmitted to this printer to print. If a plurality of printers exist on the radio network 300, image data is transmitted to a specified printer to print.

In the second embodiment, pieces of property information about which each printer existing on the radio network 300 is inquired are printable color count information and maximum resolution information. However, the present invention is not limited to this. For example, as in the first embodiment, printer manufacturer information and model information may be used as pieces of property information.

Obviously, the present invention incorporates a method of the printer property information acquired in this case to the mounted digital camera to select a printer on the digital camera and receiving the selection result from the digital camera to specify a printer to be used for printing.

The second embodiment has exemplified the case where serial communication is performed between the function expansion apparatus and the digital camera through the connection connector. However, the present invention is not limited to this, and any communication scheme can be used as long as data can be transmitted. For example, an infrared communication scheme such as IrDA may be used.

The second embodiment has exemplified the case where display of the operation state of the function expansion apparatus and alarm display are performed by using the LED lamp. Obviously, however, a liquid crystal display unit or the like may be provided for the function expansion apparatus to perform display of an operation state and alarm display by displaying character information and graphic pattern information.

Each embodiment described above has exemplified the digital camera. However, a digital camera may be regarded as a playback apparatus for playing back image data stored in a storage medium such as a memory card, and the present invention may be applied to a video playback-only machine having only the function of playing back image data without any image pickup function.

The present invention is not limited to the apparatus according to the above embodiments and may be applied to a system constituted by a plurality of devices or an apparatus comprising a single device. The present invention incorporates a control method of supplying a storage medium storing software program codes for realizing the functions of the above-described embodiments to a system or apparatus, and causing the computer (or a CPU or an MPU) of the system or apparatus to execute the above functions in a software manner in accordance with the program codes stored in the storage medium.

In this case, the program codes read out from the storage medium realize the functions of the above-described embodiments by themselves, and the storage medium storing the program codes constitutes the present invention. As a storage medium for supplying the program codes, a floppy disk, a hard disk, an optical disk, a magnetooptical disk, a CD-ROM, a CD-R, a magnetic tape, a nonvolatile memory card, a ROM, or the like can be used. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described in detail above, according to the present invention, when photography is performed by an electronic camera such as a digital camera and an instruction to print image data is issued, printing can be performed as follows. If one printing apparatus exists on a radio network, the image data is transmitted to this printing apparatus to print an image. If a plurality of printing apparatuses exist on the radio network, the image data is transmitted to a selected printing apparatus to print an image.

With this operation, image data obtained by photography can be reliably transmitted to a printing apparatus existing on a radio network and printed with simple operation without designating any printing apparatus in advance.

Even if the printing apparatuses existing on the radio network change with a change in the configuration of the radio network or the like, the problem that printing cannot be performed can be prevented, and image data can be reliably printed.

The present invention is not limited to the embodiments described above, and various modifications can be made within the spirit and scope defined in the appended claims.

What is claimed is:
1. A digital camera comprising:
an image pickup unit;
a photographing operation unit which instructs the image pickup unit to start image pickup processing;
a photographing processing unit which, in accordance with the instruction by the photographing operation unit, causes the image pickup unit to perform the image pickup processing and stores image data on a storage medium;
a print instruction unit which instructs to print;
a display unit which previews the image data obtained by the image pickup processing, after completion of photographing by the photographing processing unit and before a next image pickup processing thereby; and
a transmission unit which transmits the image data stored on the storage medium to an external printer when the print instruction unit instructs to print during preview of the image data by the display unit.

2. A camera according to claim 1, further comprising:
a discrimination unit which discriminates whether an external communication apparatus includes a printer, after the print instruction unit instructs to print.

3. A camera according to claim 2, wherein the display unit is arranged so as to display a warning when the discrimination unit discriminates that the printer is not included in the external communication apparatus.

4. A camera according to claim 1, wherein the photographing operation unit monitors the instruction to start the image pickup processing, after the transmission unit transmits the image data to the external printer.

5. A control method for a digital camera including an image pickup unit, an image pickup instruction unit which instructs the image pickup unit to start image pickup processing, and a print instruction unit which instructs to print a photographed image, the control method comprising:
a photographing processing step of, in accordance with the instruction, causing the image pickup unit to perform the image pickup processing and storing image data on a storage medium;
a display step of previewing the image data obtained by the image pickup processing, after completion of photographing performed in the photographing processing step and before the next image pickup processing therein; and
a transmission step of transmitting the image data stored on the storage medium to an external printer in accordance with the print instruction by the print instruction unit during preview of the image data in the display step.

6. A method according to claim 5, further comprising:
a discrimination step of discriminating whether an external communication apparatus includes a printer, after the print instruction unit instructs to print the photographed image.

7. A method according to claim 6, wherein the display step includes a step of displaying a warning when the discrimination step discriminates that the printer is not included in the external communication apparatus.

8. A method according to claim 5, wherein the photographing operation step includes a step of monitoring the instruction to start the image pickup processing, after the transmission step transmits the image data to the external printer.

9. A digital camera comprising:
an image pickup instruction unit which instructs to start image pickup processing; an image pickup unit which picks up an image in accordance with the image pickup processing start instruction by the image pickup instruction unit; and
a display unit which previews the image picked up by the image pickup unit, after the image pickup processing for a predetermined period of time or until the start of a next image pickup processing,
wherein if a print instruction button is not operated during the image preview by the display unit so that the image pickup apparatus remains in a photographing mode, the image pickup instruction unit is monitored to wait for the image pickup processing start instruction.

10. A camera according to claim 9, further comprising a communication unit which communicates with an external printer, and a transmission unit which transmits image data to the external printer in accordance with the instruction provided by operating the print instruction button.

11. A control method for a digital camera including an image pickup unit, an image pickup instruction unit which instructs to start image pickup processing, and a print instruction button operative to instruct to print, the control method comprising:
   an image pickup step of picking up an image with the image pickup unit in accordance with the image pickup processing start instruction by the image pickup instruction unit; and
   a display step of previewing the image picked up in the image pickup step, after the image pickup processing in the image pickup step for a predetermined period of time or until the start of a next image pickup processing,
   wherein if the print instruction button is not operated during the image preview in the display step so that the image pickup apparatus remains in a photographing mode, the image pickup instruction unit is monitored to wait for the image pickup processing start instruction.

12. A control method according to claim 11, further comprising a communication step of communicating with an external printer, and a transmission step of transmitting image data to the external printer in accordance with the instruction provided by operating the print instruction button.

* * * * *

UNITED STATES PATENT AND TRADEMARK OFFICE
CERTIFICATE OF CORRECTION

PATENT NO. : 7,359,080 B2
APPLICATION NO. : 11/219655
DATED : April 15, 2008
INVENTOR(S) : Hideki Takemura It is certified that error appears in the above-identified patent and that said Letters Patent is hereby corrected as shown below:

IN THE DRAWINGS
Sheet 4, Fig. 4, "PRINTER ?" should read --A PRINTER ?--.
Sheet 8, Fig. 8, "PRINTER ?" should read --A PRINTER ?--.

COLUMN 2
Line 62, "input" should read --an input--.

COLUMN 3
Line 18, "views" should read --views,--.

COLUMN 5
Line 21, "transmit" should read --transmits--.
Line 50, "301 to 306" should read --301 to 306,--.

COLUMN 6
Line 50, "use" should read --user--.

COLUMN 7
Line 26, "exist" should read --exists--.

COLUMN 8
Line 36, "processed" should read --process--.
Line 39, "exist" should read --exists--.

UNITED STATES PATENT AND TRADEMARK OFFICE
CERTIFICATE OF CORRECTION

PATENT NO.        : 7,359,080 B2
APPLICATION NO.   : 11/219655
DATED             : April 15, 2008
INVENTOR(S)       : Hideki Takemura It is certified that error appears in the above-identified patent and that said Letters Patent is hereby corrected as shown below:

COLUMN 10
Line 45, "exist" should read --exists--.

COLUMN 11
Line 64, "exist" should read --exists--.
Line 66, "trough" should read --through--.

Signed and Sealed this

Twenty-seventh Day of January, 2009

JOHN DOLL
*Acting Director of the United States Patent and Trademark Office*